United States Patent Office 3,720,668
Patented Mar. 13, 1973

3,720,668
NITROFURYL-OXADIAZOLE AMIDES
Hermann Breuer, Burgweinting, Germany, assignor to
E. R. Squibb & Sons, Inc., New York, N.Y.
No Drawing. Filed Aug. 12, 1970, Ser. No. 63,328
Int. Cl. C07d 85/52
U.S. Cl. 260—240 A                    11 Claims

ABSTRACT OF THE DISCLOSURE

Amide derivatives of 3-(5-nitro-2-furyl)-1,2,4-oxadiazole-5-carboxylic acid are useful as antimicrobial agents.

SUMMARY OF THE INVENTION

This invention relates to new amide derivatives of 3-(5-nitro-2-furyl)-1,2,4-oxadiazole-5-carboxylic acid which have the structural formula (I)
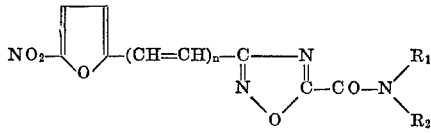

wherein $n$ is 0 or 1, $R_1$ is hydrogen or hydroxy-lower alkylene, $R_2$ is hydrogen, amino, hydroxy, hydroxy-lower alkylene or hydroxy-lower alkylene-amino.

These symbols have the same meaning throughout this specification.

DETAILED DESCRIPTION OF THE INVENTION

The lower alkylene groups included in the radicals represented by $R_1$ and $R_2$ are straight or branched chain aliphatic hydrocarbon groups with up to seven carbon atoms. The hydroxy-lower alkylene groups (in which the hydroxy group is preferably on the terminal carbon) including, for example, hydroxymethyl, 2-hydroxyethyl (which is preferred), 3-hydroxypropyl and the like. The hydroxy-lower alkylene-amino groups have similar radicals attached to an amino group, for example, 2-hydroxyethylamino (which is preferred), and the like.

The compounds of Formula I are produced by reacting an amine of the formula (II)

at room temperature or slightly above, e.g., up to about 35° C., in an organic solvent like dioxane, tetrahydrofuran, dimethylformamide or an alcohol, with a 3-(5-nitro-2-furyl)-1,2,4-oxadiazole-5-carboxylic acid ester of the formula (III)
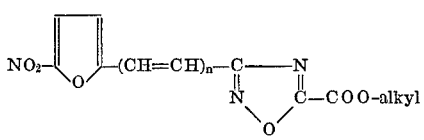

preferably a lower alkyl ester like the ethyl ester. For best results the amine is present in excess, e.g., about 3:1.

The compound of Formula III is obtained from an amidoxime of the formula (IV)
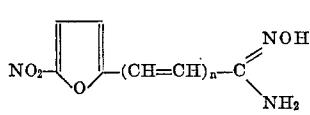

for example by reaction with an oxalic acid monoester acid chloride, e.g., oxalic acid monoethyl ester chloride (Cl—CO—COO—C₂H₅) at about 0–25° C. in a solvent such as dioxane, tetrahydrofuran or dimethylformamide to obtain an intermediate of the formula (V)
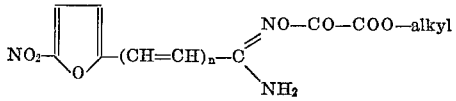

which is then heated at a temperature up to about the temperature of refluxing xylene.

The new compounds of Formula I are useful as antimicrobial agents and may be used to combat infections in animal species, such as mice, rats, dogs, guinea pigs and the like, due to organisms such as *Trichomonas vaginalis, Trichomonas foetus, Staphylococcus aureus, Salmonella schottmuelleri, Klebsiella pneumoniae, Proteus vulgaris, Escherichia coli* or *Trichophyton mentagrophytes*. For example, a compound or mixture of compounds of Formula I may be administered orally to an infected animal, e.g., to a mouse, in an amount of about 5 to 25 mg. per kg. per way in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleaning agent, e.g., a solid or liquid detergent, detergent composition, for example, in general cleaning, in cleaning dairy barns or equipment or in cleaning food handling or processing equipment.

The following examples, which constitute preferred embodiments, are illustrative of the invention. By variation of the amine used, additional members of the class are obtained. All temperatures are on the centigrade scale.

EXAMPLE 1

To a solution of 171 gms. (1 mol.) of 5-nitro-2-furyl-amidoxime and 120 gms. of pyridine in 750 ml. of anhydrous tetrahydrofuran are added dropwise at a temperature of about 20°, 204 gms. (1.5 mol.) of oxalic acid monoethyl ester acid chloride. A thick crystalline slurry forms. The reaction mixture is refluxed for one hour and then concentrated in a rotary evaporator. The residue is treated with water and filtered under suction. The yield amounts to 246 gms. of 3-(5-nitro-2-furyl)-1,2,4-oxadiazole-5-carboxylic acid ethyl ester. A sample, which is recrystallized from benzene, melts at 146–147°.

60 gms. of 3-(5-nitro-2-furyl)-1,2,4-oxadiazole-5-carboxylic acid ethyl ester are dissolved in 500 ml. of dioxane. 48 gms. of concentrated aqueous ammonia solution are added and the mixture is permitted to stand overnight. After a short time the reaction product begins to crystallize out. On the following day, the crystals are filtered under suction and the mother liquor is concentrated. The combined yield is 55.3 gms. of 3-(5-nitro-2-furyl)-1,2,4-oxadiazole-5-carboxamide, M.P. 224–225°.

By the same procedure, the reaction of 3-[2-(5-nitro-2-furyl)vinyl]-1,2,4-oxadiazole-5-carboxylic acid ethyl ester with ammonia yields 3-[2-(5-nitro-2-furyl)vinyl]-1,2,4-oxadiazole-5-carboxamide, M.P. 255–256° (dec.).

EXAMPLE 2

A suspension of 146 gms. of 2-(5-nitro-2-furyl)-acrylamidoxime in 770 ml. of anhydrous dioxane are treated with 66 gms. of pyridine and then 156 gms. of oxalic acid monoethyl ester acid chloride are added dropwise with stirring. The reaction temperature is kept below 20° by external cooling. When all of the oxalic acid monoethyl ester acid chloride has been added, a clear solution results, which soon becomes a thick slurry which can barely be stirred. Upon the addition of water, the reaction product, 171.2 gms. of 3-[2-(5-nitro-2-furyl)vinyl]-1,2,4-oxadiazole-5-carboxylic acid ethyl ester, M.P. 133–134°, precipitates.

13.96 gms. (0.05 mol.) of the ester obtained above are dissolved in 200 ml. of dioxane, 10.5 gms. (0.1 mol.) of diethanolamine are added and the solution is stirred for 5 hours. The solution is kept overnight in the refrigerator, then the precipitated crystals are filtered under suction. The yield is 12.8 gms. of N,N-bis-(2-hydroxyethyl)-3-[2-(5-nitro-2-furyl)vinyl] - 1,2,4 - oxadiazole-5-carboxamide, M.P. 131–133° (dec.).

EXAMPLE 3

Following the procedure of Example 2 utilizing 3-(5-nitro-2-furyl)-1,2,4-oxadiazole-5 - carboxylic acid, ethyl ester, there is obtained N,N-bis-(2-hydroxyethyl)-3-(5-nitro-2-furyl)-1,2,4-oxadiazole - 5 - carboxamide, M.P. 126–127°.

By utilizing the above starting materials and substituting ethanolamine for the diethanolamine in the procedure of Example 2, there is obtained N-(2-hydroxyethyl)-3-(5-nitro-2-furyl)-1,2,4-oxadiazole-5-carboxamide.

EXAMPLE 4

12.7 gms. (0.05 mol.) of 3-(5-nitro-2-furyl)-1,2,4-oxadiazole-5-carboxylic acid ethyl ester are dissolved in 100 ml. of dioxane and 100 ml. of 1.5 mole ethanolic hydroxylamine solution are added. After a short time a precipitate begins to crystallize. The mixture is permitted to stand overnight and then filtered under suction. The crystals are suspended in 600 ml. of water and brought into solution by the addition of sodium bicarbonate with warming. The solution is filtered while warm, acidified with 2 N hydrochloric acid, cooled, the crystals are filtered under suction and dried. The yield is 8.9 gms. of 3-(5-nitro-2-furyl)-1,2,4-oxadiazole-5 - carbohydroxamic acid M.P. 164–165° (dec.).

By substituting 3-[2-(5-nitro-2-furyl)vinyl]1,2,4-oxadiazole-5-carboxylic acid ethyl ester in the foregoing procedure, there is obtained 3-[2-(5-nitro-2-furyl)vinyl]-1,2,4-oxadiazole-5-carbohydroxamic acid, M.P. 188°.

EXAMPLE 5

12.7 gms. (0.05 mol.) of 3-(5-nitro-2-furyl)-1,2,4-oxadiazole-5-carboxylic acid ethyl ester are dissolved in 100 ml. of dioxane and 7.61 gms. (0.1 mol.) of 2-hydroxyethylhydrazine dissolved in 15 ml. of ethanol are added dropwise at room temperature. The solution is stirred for 15 minutes, concentrated, the residue is treated with water and the resulting crystals are filtered under suction. The yield is 10.2 gms. of 3-(5-nitro-2-furyl)-1,2,4-oxadiazole - 5 - carboxylic acid 2-(2-hydroxyethyl)hydrazide, M.P. 159° (dec.).

By substituting hydrazine hydrate for the 2-hydroxyethylhydrazine in the foregoing procedure, 3-(5-nitro-2-furyl)-1,2,4-oxadiazole-5-carboxylic acid hydrazide, M.P. 194° (dec.) is obtained.

EXAMPLE 6

By reacting 3 - [2-(5-nitro-2-furyl)vinyl]-1,2,4-oxadiazole-5-carboxylic acid ethyl ester with hydrazine hydrate according to the procedure of Example 5, 3-[2-(5-nitro-2-furyl)vinyl] - 1,2,4 - oxadiazole - 5 - carboxylic acid hydrazide, M.P. 216–217° (dec.), is obtained.

EXAMPLE 7

By reacting 3 - [2 - (5 - nitro-2-furyl)vinyl]1,2,4-oxadiazole-5-carboxylic acid ethyl ester with 2-hydroxyethyl hydrazine according to the procedure of Example 5, there is obtained 3 - [2 - (5 - nitro-2-furyl)vinyl]-1,2,4-oxadiazole-5-carboxylic acid 2-(2-hydroxyethyl) hydrazide, M.P. 157–158° (dec.).

What is claimed is:

1. A compound of the formula

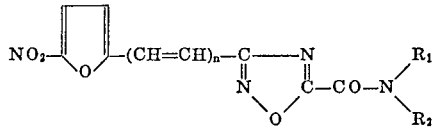

wherein $n$ is 0 or 1, $R_1$ is hydrogen or hydroxy-lower alkylene, and $R_2$ is hydrogen, amino, hydroxy, hydroxy-lower alkylene or hydroxy-lower alkyleneamino, with the proviso that no more than one of $R_1$ and $R_2$ is hydrogen.

2. A compound as in claim 1 wherein $R_1$ is hydrogen and $R_2$ is hydroxy-lower alkylene.

3. A compound as in claim 1 wherein $R_1$ and $R_2$ each is hydroxy-lower alkylene.

4. A compound as in claim 2 wherein the hydroxy-lower alkylene group is hydroxyethyl.

5. A compound as in claim 3 wherein the hydroxy-lower alkylene group is hydroxyethyl.

6. A compound as in claim 4 wherein $n$ is 0.

7. A compound as in claim 5 wherein $n$ is 0.

8. A compound as in claim 5 wherein $n$ is 1.

9. A compound as in claim 1 wherein $R_1$ is hydrogen, $R_2$ is hydroxy and $n$ is 1.

10. A compound as in claim 1 wherein $R_1$ is hydrogen, $R_2$ is amino and $n$ is 1.

11. A compound as in claim 1 wherein $R_1$ is hydrogen, $R_2$ is amino and $n$ is 0.

References Cited

UNITED STATES PATENTS 3,478,049   11/1969   Von Esch _____ 260—240 A X
3,493,565   2/1970    Breuer _____ 260—240 A

FOREIGN PATENTS 1,514,027   1/1968   France _____ 260—240 A

JOHN D. RANDOLPH, Primary Examiner

U.S. Cl. X.R.

424—272; 260—307 G, 347.4, 347.7